(12) United States Patent
Kerschbaum et al.

(10) Patent No.: US 7,995,750 B2
(45) Date of Patent: Aug. 9, 2011

(54) PRIVACY-PRESERVING CONCATENATION OF STRINGS

(75) Inventors: Florian Kerschbaum, Karlsruhe (DE); Luciana Moreira Sa de Souza, Karlsruhe (DE)

(73) Assignee: SAP AG, Waldorf (DE)

( * ) Notice: Subject to any disclaimer, the term of this patent is extended or adjusted under 35 U.S.C. 154(b) by 1172 days.

(21) Appl. No.: 11/483,246

(22) Filed: Jul. 6, 2006

(65) Prior Publication Data
US 2008/0010467 A1      Jan. 10, 2008

(51) Int. Cl.
*H04K 1/04*      (2006.01)
*G06F 11/30*     (2006.01)

(52) U.S. Cl. .............. 380/37; 712/300; 380/29; 380/42; 713/162; 713/189

(58) Field of Classification Search .................... 380/37; 713/189
See application file for complete search history.

(56) References Cited

U.S. PATENT DOCUMENTS

| | | | | |
|---|---|---|---|---|
| 5,495,532 | A * | 2/1996 | Kilian et al. .................... | 380/30 |
| 5,568,554 | A * | 10/1996 | Eastlake, 3rd ................ | 713/181 |
| 6,772,343 | B1 | 8/2004 | Shimizu et al. | |
| 2004/0131181 | A1* | 7/2004 | Rhoads .......................... | 380/37 |
| 2007/0156586 | A1 | 7/2007 | Kerschbaum | |
| 2007/0220094 | A1 | 9/2007 | Kerschbaum et al. | |
| 2008/0019510 | A1 | 1/2008 | Kerschbaum et al. | |

FOREIGN PATENT DOCUMENTS

| | | |
|---|---|---|
| EP | 1383265 A1 | 1/2004 |
| WO | WO-2005034423 A1 | 4/2005 |

OTHER PUBLICATIONS

"International Application Serial No. 07011111.7, Extended European Search Report mailed Dec. 20, 2007", 5 pgs.
"U.S. Appl. No. 11/482,262 , Non-Final Office Action mailed Oct. 19, 2009", 39 pgs.
"U.S. Appl. No. 11/482,262, Examiner Interview Summary mailed Jan. 4, 2010", 3 pgs.
"U.S. Appl. No. 11/482,262, Final Office Action mailed Apr. 14, 2010", 48 pgs.
"U.S. Appl. No. 11/482,262, Response filed Jan. 19, 2010 to Non Final Office Action mailed Oct. 19, 2009", 27 pgs.

* cited by examiner

*Primary Examiner* — Taghi T Arani
*Assistant Examiner* — Mohammad L Rahman
(74) *Attorney, Agent, or Firm* — Schwegman, Lundberg & Woessner, P.A.

(57) ABSTRACT

A system for contributing to a concatenation of a first string and a second string may include a communication unit to receive an encrypted representation of a second share of the second string, the second string being identical to the second share of the second string combined with a first share of the second string and to send a rearranged representation of the encrypted representation of the second share of the second string to a second system. The system may further include a processing unit to rearrange a representation of the encrypted representation of the second share of the second string using a length value of a first share of the first string, the first string being identical to the first share of the first string combined with a second share of the first string.

32 Claims, 7 Drawing Sheets

PRIVACY-PRESERVING CONCATENATION OF STRINGS

TECHNICAL FIELD

Embodiments relate to the field of electronic data processing and more particularly to secure computing.

BACKGROUND AND PRIOR ART

The field of electronic data processing has reached a high level of development. Many different kinds of data are processed and exchanged electronically. Data that is exchanged may be required to be protected against an access of unauthorized parties so that the data remain private. Secure computing may include processing and exchanging private data in such a way that privacy of the data is preserved.

Frequently, data that is processed may be represented as strings. The strings may include a sequence of elements, for example characters of the American Standard Code for Information Interchange (ASCII) code or Unicode. The strings may include elements that represent one or more text elements, for example, words or expressions that are meaningful in a language. Strings may be used in different areas for processing and exchanging data.

As an example, an enterprise may have a confidential document such as a purchase order. The enterprise may desire that one or more further entities process the purchase order in such a way that the one or more further entities may not be able to understand the contents of the purchase order. In an example, a data item of the purchase order, for example a product code, may be used for creating a further confidential document. Using the product code in such a way may include concatenating the product code to the further confidential document.

DETAILED DESCRIPTION

Following embodiments address a string manipulation that preserves a privacy of one or more strings that are manipulated. The string manipulation is performed by two parties and the privacy of the one or more strings is preserved with respect to the two parties. The string manipulation includes contributing to concatenating a first string to a second string.

In an example embodiment, a system of a first party participates in the string manipulation and therefore contributes to the string manipulation. The system has components that are configured to process and exchange data items according to an implemented protocol. The system has a share of the first string, a share of the second string, and a share of the concatenated string that allow for participating in the implemented protocol and preserving the privacy of the strings.

In an example embodiment, a further system of a second party participates in the string manipulation and therefore contributes to the string manipulation. The further system has components that are configured to process and exchange data items according to an implemented protocol. The further system has a further share of the first string, a further share of the second string, and a further share of the concatenated string, allowing for participating in the implemented protocol and preserving the privacy of the strings.

A further aspect includes an embodiment of a method performed by the first party. The embodiment includes operations that allow the first party to participate in an implemented protocol between the first party and the second party. The method operates with shares of the first string, of the second string, and of the concatenated string preserving the privacy of the strings.

An example embodiment includes a method performed by the second party. The embodiment includes operations that allow the second party to participate in an implemented protocol between the first party and the second party. The method operates with shares of the first string, of the second string, and of the concatenated string preserving the privacy of the strings.

An example embodiment includes a computer program product including instructions that may configure a computer system to execute operations in accordance with an implemented protocol or any of an example method described herein.

A further example embodiment includes a further computer program product including instructions that may configure a computer system to execute further operations in accordance with an implemented protocol or any of an example method described herein.

Systems that participate in an implemented protocol may provide a high level of security for preserving the privacy. One reason is that encryption of data has reached a high level of development and using the encryption of data provides a high level of security. Furthermore, each system preserves the privacy of the first string, the second string, and the concatenated string so that successive string manipulations may be performed preserving the privacy of processed strings. As an example, this may prevent a system from being able to collect information about a string from successive string manipulations and derive statements about contents of the string. Furthermore, the systems may be able to participate in the protocol without relying on a further trusted system for performing further operations. Systems participating in an implemented protocol may be provided with corresponding shares of the first string and of the second string by a further system. By distributing the shares the further system may obtain a high level of security that the first string, the second string, and the concatenated string remain private and are not revealed to the systems participating in the protocol.

The systems may be efficient compared to general circuit constructions because the systems perform calculations that are less costly than calculations of general circuit constructions. As an example, general circuit constructions may include calculating modular exponentiation which may not be required to be calculated by the systems. Furthermore, the systems may be efficient because a low number of data items may be exchanged.

Methods including operations contributing to an implemented protocol may provide a high level of security because using the encryption of data may be able to provide the high level of security. The methods preserve the privacy of the first string, the second string, and the concatenated string so that successive string manipulations may be performed preserving the privacy of processed strings. Furthermore, the methods may be part of the protocol without relying on a further trusted system for performing further operations.

The methods may be efficient compared to general circuit constructions because calculations of the methods may be less costly than calculations of general circuit constructions and a low number of data items may be exchanged.

Computer program products that configure a computer system to execute operations according to embodiments of a method may also provide the high level of security and efficiency of the embodiments of the method.

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
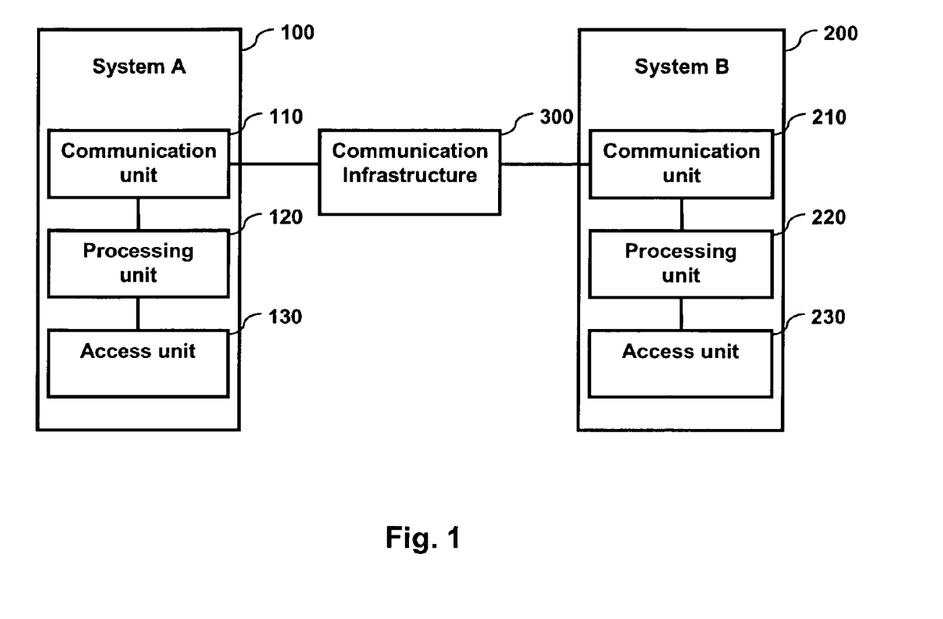
FIG. 1 is a block diagram of two example systems processing and exchanging data items.

FIG. 1 is a block diagram of two example systems processing and exchanging data items. System A 100 and System B 200 are embodiments configured to contribute to a concatenation of a first string and a second string. System A 100 may be a computer system and may include a communication unit 110, a processing unit 120, and an access unit 130. System B 200 may be a computer system and include a communication unit 210, a processing unit 220, and an access unit 230. Lines between blocks of the figure represent communicative couplings to exchange data between the blocks. In a further example, embodiments may include one or more systems without access units. The system A 100 is connected to the system B 200 through a communication infrastructure 300.

The system A 100 may be a personal computer (PC), a server, or a plurality of servers configured to execute software programs. The system 100 may include a client and a server related according to client server architecture, or may include one or more peer computers arranged in a peer-to-peer (or distributed) architecture. In a further example, the computer system may include a plurality of individual computer systems that are connected by the Internet or by an intranet of for example a company.

The system A 100 may run (for example host and execute) a program that configures the system A 100 to participate in a protocol for concatenating the first string and the second string.

The communication unit 110 of the system A 100 may include a piece of hardware to receive and send signals that represent electronic data. Such a piece of hardware may be for example a modem, an Ethernet plug, or a device for wireless transmission of data. The communication unit 110 may also include a server to exchange data with the communication infrastructure 300. The communication unit 110 may further include a piece of software, for example, a program to control a communication with the processing unit 120 and the communication infrastructure 300.

The communication unit 110 may be configured to receive an encrypted representation of a second share of the second string. The second string may include the second share of the second string combined with a first share of the second string. In an example, the second string may be identical to the second share of the second string combined with the first share of the second string. Combining the second share of the second string with the first share of the second string may include using a combining operation. The combining operation may include using the second share of the second string and the first share of the second string as inputs of a function to generate the second string or a string that includes the second string. Such a combining operation may be used for further examples described herein when two strings are combined to generate a resulting string. The communication unit 110 may be configured to send a rearranged representation of the encrypted representation of the second share of the second string to the system B 200.

With this, the communication unit 110 may contribute to the computing a second share of the concatenated string. A first share of the concatenated string and the second share of the concatenated string may be combined to give the concatenated string. In order to contribute to computing the first share of the concatenated string the communication unit 110 may have certain features. In a further example, the communication unit 110 may be without the certain features and a further system may contribute to computing the first share of the concatenated string.

The communication unit 110 may be further configured to send an encrypted representation of the first share of the second string to the second party and receive a rearranged representation of the encrypted representation of the first share of the second string. In a further example, a further system may be configured to send the encrypted representation of the first share of the second string to the second party and receive the rearranged representation of the encrypted representation of the first share of the second string.

The access unit 130 may include a random access memory (RAM), a database, or a file stored on a hard disc drive. The access unit 130 may include a further computer system that is used for storing data such as a database server. The access unit 130 may be configured to access the first share of the second string. The access unit 130 may access the first share of the second string upon a request of the processing unit 120. The access unit 130 may accordingly provide the requested first share to the processing unit 120.

The processing unit 120 may be for example a central processing unit (CPU) of the system A 100 or an individual computer system that is a part of the computer system A 100. The processing unit 120 may also include software, for example, an operating system program.

The processing unit 120 may be configured to rearrange a representation of the encrypted representation of the second share of the second string using a length value of a first share of the first string. In this way, the processing unit may be able to generate a rearranged representation of the encrypted representation of the second share of the second string. Throughout the description, the processing unit may generate values by executing a specified manipulation of a specified start value. The first string may include or be identical to the first share of the first string combined with a second share of the first string. In an example, a combining operation with a function having as input the first share of the first string and the second share of the first string may be used to combine the first share of the first string and the second share of the first string.

With this, the processing unit 120 may contribute to the computing the second share of the concatenated string. In order to contribute to computing the first share of the concatenated string the processing unit 120 may have certain features. In a further example, the processing unit 120 may be without the certain features and a further system may contribute to computing the first share of the concatenated string.

The processing unit 120 may further be configured to encrypt the representation of the first share of the second string and compute a decrypted string by decrypting the rearranged representation of the encrypted representation of the first share of the second string. The processing unit 120 may also be configured to rearrange the decrypted string using the length value of the first share of the first string and compute a first share of a string. The string may include the first string concatenated with the second string by combining the first share of the first string with the rearranged decrypted string. The string may include or be identical to the first share of the string combined with a second share of the string that may be obtained by the second system B 200. In a further example, a further system may be configured to encrypt the representation of the first share of the second string, compute the decrypted string, rearrange the decrypted string, and compute the first share of the string.

The communication infrastructure 300 may be for example the Internet that has no access control or an intranet with limited access by one or more entities. In a further example, the communication infrastructure 300 may also be a direct connection the system A 100 and the system B 200.

The system B 200 may be a PC a server, or a number of servers configured to execute software programs. An embodiment of the system B 200 may have a structure that is identical to or different from a structure of an embodiment of the system A 100. This is also true for the components of the system B 200 that may be identical in structure to or different from the corresponding components of the system A.

The communication unit 210 may be configured to send an encrypted representation of the second share of the second string to the system A 100. The communication unit 210 may be configured to receive a rearranged representation of the encrypted representation of the second share of the second string.

With this, the communication unit 210 may contribute to the computing the second share of the concatenated string. In order to contribute to computing the first share of the concatenated string the communication unit 210 may have certain features. In a further example, the communication unit 210 may be without the certain features and a further system may contribute to computing the first share of the concatenated string.

The communication unit 210 may be configured to receive an encrypted representation of the first share of the second string. The encrypted representation may have been sent from the system A 100. The communication unit 210 may also be configured to send a rearranged representation of the encrypted representation of the first share of the second string. In a further example, a further system may be configured to receive the encrypted representation of the first share of the second string and send the rearranged representation of the encrypted representation of the first share of the second string.

The access unit 230 may be configured to access a second share of the second string, in response to a respective request of the processing unit 220.

The processing unit 220 may be configured to encrypt the representation of the second share of the second string and compute a decrypted string. Computing the decrypted string may include decrypting the rearranged representation of the encrypted representation of the second share of the second string. The processing unit 220 may be configured to rearrange the decrypted string using the length value of the second share of the first string and compute the second share of the string. The second share of the string may include the first string concatenated with the second string. Computing the second share of the string may include combining the second share of the first string with the rearranged decrypted string.

With this, the processing unit 220 may contribute to the computing the second share of the concatenated string. In order to contribute to computing the first share of the concatenated string the processing unit 220 may have certain features. In a further example, the processing unit 220 may be without the certain features and a further system may contribute to computing the first share of the concatenated string.

The processing unit 220 may also be configured to rearrange a representation of the encrypted representation of the first share of the second string using a length value of the second share of the first string. In a further example, a further system may be configured to rearrange the representation of the encrypted representation of the first share of the second string.

Figure 2:
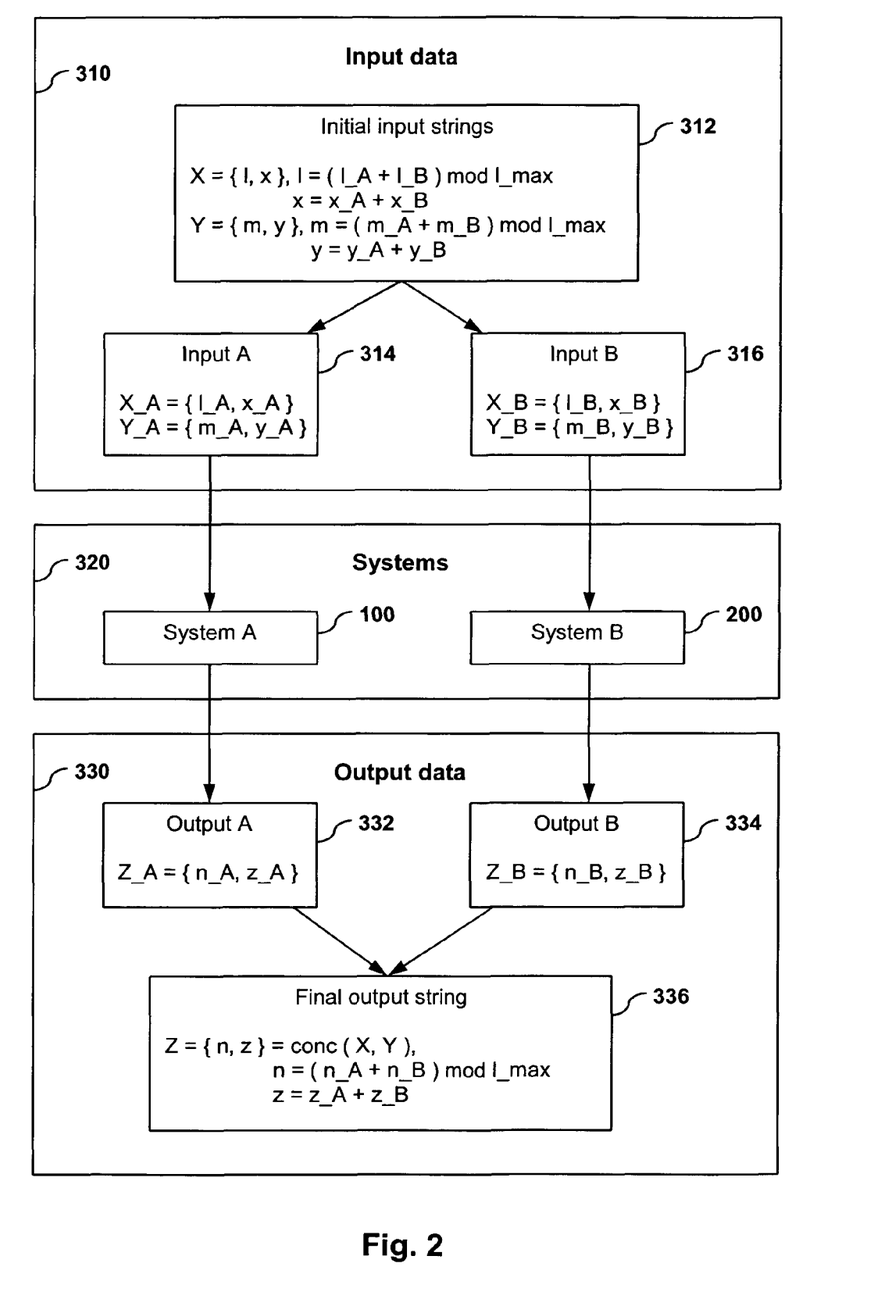
FIG. 2 is a block diagram of input data and output data of two example systems.

FIG. 2 is a block diagram of input data 310 and output data 330 of two example systems 320. The input data 310 include initial input strings 312, input A 314, and input B 316. The output data 330 include output A 332, output B 334, and final output string 336. Arrows between blocks represent a functional relation between data items of a block.

In an example, a string is represented by specifying a length of the string and a sequence of elements. When the sequence has more elements than the length of the string, the elements of the sequence that are not a part of the string may be identical to a padding value. The padding value may for example be selected to be represented in a binary representation by a sequence of zeros. In an example, representations of the strings have a length identical to (l_max−1) bytes, one byte representing one element of the sequence of the string. The length value l_max may be identical to a power of two. In a further example, a string may be represented for example by a zero-terminated string representation.

The input data 320 include the initial input strings 312 one of which is the first string represented by X={1, x} having string length value l and element sequence x. The first string can be obtained by combining the first share of the first string represented by X_A={1_A, x_A} and the second share of the first string represented by X_B={1_B, x_B}. The string length value l can be obtained from a length value of the first share 1_A and a length value of the second share 1_B by calculating l=(1_A+1_B) mod 1_max. The mod 1_max represents the modulus function with respect to 1_max. The sequence x can be obtained from the sequence of the first share x_A and from the sequence of the second share x_B by combining the sequences x=x_A+x_B.

In an example, a string may be combined with a further string by transforming a sequence of elements of the string into a bit sequence. This may be done by representing each element of the sequence by a number of bits that are part of the bit sequence. Accordingly, a sequence of elements of the further string may be transformed into a further bit sequence. In an example, the bit sequence and the further bit sequence are combined by using an exclusive OR operation to combine each bit of the bit sequence with a corresponding bit of the further bit sequence. The resulting bit is a corresponding bit of a bit sequence representing a combined sequence of the combined string. In a further example, a sequence may be transformed into a different representation of the sequence. Furthermore, the operation on bits may be different from an exclusive OR operation, for example, the exclusive OR operation combined with a not operation.

The initial input strings 312 further include the second string represented by representation Y={m, y} having string length m and element sequence y. The second string may be obtained by combining the first share of the second string represented by $Y\_A=\{m\_A, y\_A\}$ and the second share of the second string represented by $Y\_B=\{m\_B, y\_B\}$. The string length m can be obtained from a length of the first share m_A and a length of the second share m_B by calculating $m=(m\_A+m\_B) \mod l\_max$. The sequence y can be obtained from the sequence of the first share y_A and the sequence of the second share y_B by combining the sequences $y=y\_A+y\_B$.

The input A 314 includes the first share of the first string represented by X_A and the first share of the second string represented by Y_A. The input A 314 may be transmitted as input to system A 100 that is a part of system embodiments 320.

The input B 316 includes the second share of the first string represented by X_B and the second share of the second string represented by Y_B. The input B 316 may be transmitted as input to system B 200 that is a part of system embodiments 320.

In an example, the inputs to the system embodiments are transmitted using the same communication infrastructure that the system A 100 and the system B 200 use for exchanging data according to the protocol. In order to simplify the diagram the data exchanged between the system A 100 and the system B 200 are not displayed in the figure.

The output data 330 include the output A 332 with the first share of the concatenated string represented by $Z\_A=\{n\_A, z\_A\}$ having a length n_A and sequence z_A. The output data 330 further include the output B 334 with the second share of the concatenated string represented by $Z\_B=\{n\_B, z\_B\}$ having a length n_B and sequence z_B.

The first share of the concatenated string represented by Z_A and the second share of the concatenated string represented by Z_B can be combined to give the final output string 336 represented by $Z=\{n, z\}$. In an example, Z is identical to the concatenated first string and second string, represented by conc (X, Y). Z can be obtained by calculating $n=(n\_A+n\_B) \mod l\_max$ and computing combination $z=z\_A+z\_B$.

In a further example, output A 332 may not be combined with output B 334 to give final output string 336. Instead output A 332 and output B 334 may be processed further separately, for example, for performing a further string manipulation. Similarly, input A 314 and input B 316 may be a result of a previous string manipulation and may not be computed from the initial input strings 312.

Computing the final output string 336, it may be that Z has a length n that is greater than l_max so that an overflow occurs. Such an overflow may be prevented by selecting an l_max that is large enough based on the lengths of the shares. This may include determining a l_max for which it is true $(l\_A+l\_B) \mod l\_max+(m\_A+m\_B) \mod l\_max<lmax$. In order to determine l_max, system A and system B may exchange some of the length values l_A, l_B, m_A, and m_B or values larger than the length values. This may be done using a standard circuit construction technique so that l_max may be determined without system A 100 revealing l_A or m_A to system B 200 or system B 200 revealing l_B or m_B to system A 100.

Figure 3:
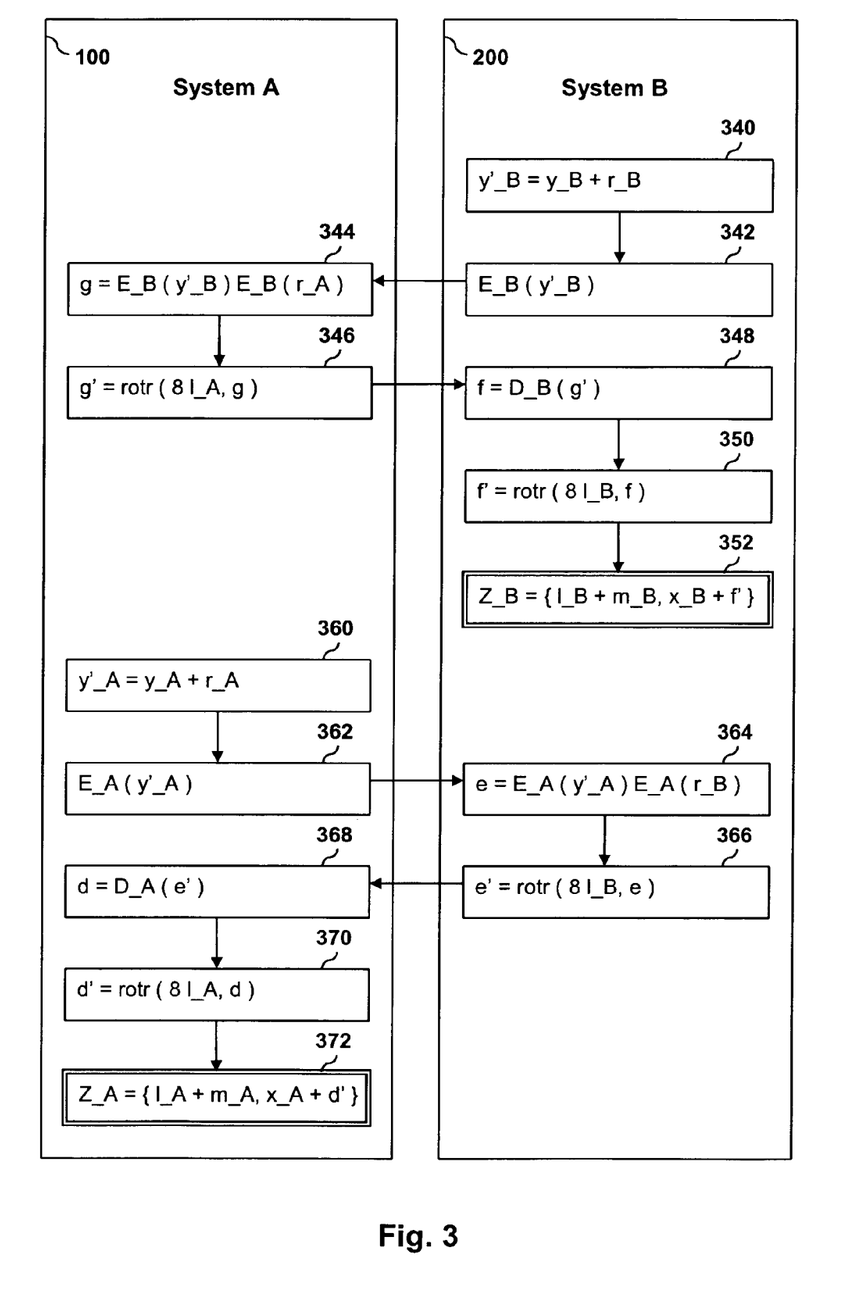
FIG. 3 is a block diagram of example embodiments of systems and data items processed and exchanged by the systems.

FIG. 3 is a block diagram of example embodiments of systems and data items processed and exchanged by the systems. The data items may be classified into data items related to computing the second share of the concatenated string represented by Z_B 352 and data items related to computing the first share of the concatenated string represented by Z_A 372. The data items Z_B 352 and Z_A 372 may be final results and are displayed with double lines. In a further example, the first share of the concatenated string represented by Z_A 372 may be computed using further systems that may be different from system A 100 and system B 200.

Computing the second share of the concatenated string represented by Z_B 352 may start with data item 340 being processed by the system B 200. The data item 340 includes a sequence y'_B of a representation of the second share of the second string. The sequence y'_B of the representation of the second share is computed by combining the sequence of the second share y_B of the second string with a sequence of a string of random elements r_B. The random elements may be determined using a standard random number generator to determine random, pseudo-random or substantially random values. In a further example, the representation of the second share may be identical to the second share of the second string because no string with random elements is combined with the second share of the second string. The data item 340 may be used to compute data item 342.

Data item 342 represents a sequence of the encrypted representation E_B (y'_B) of the second share, the second share having the sequence y_B. The representation of the second share of the second string is encrypted with a public key encryption scheme E_B that is homomorphic with respect to the combining operation. Encrypting a string may include encrypting each bit of a bit sequence representing a sequence of the string. In a further example, encrypting a string may include encrypting a portion of the bits of a bit sequence of the string. The portion may for example include every second bit of the bit sequence. In a further example, the portion may include one or more sub-sequences of bits or bytes of the bit sequence that may be related to a homomorphic encryption scheme. In a still further example, an encrypted string may be identical to the string for example in the event of that the string is a result of an original string combined with a string of random elements. In an example of the figure, the public key encryption scheme may use a pair of keys one of which is a public key for encrypting a value and one of which is a private key for decrypting a value. System B 200 may provide the public key used for encryption scheme E_B to system A 100 so that system A 100 may encrypt strings with E_B.

E_B is an example of a homomorphic encryption scheme E for which it is true $E(S) E(T)=E(S+T)$, S and T being strings. Furthermore, it is true that $E(S) \square u=E(S \square u)$, with $S \square u$ being an AND operation between bits of the bit sequence S and individual bit u and $E(S) \square u$ being identical to $E(u)$ if $u=0$ and identical to $E(S)$ if $u=1$. Furthermore, the homomorphic encryption scheme E may be semantically secure so that a plain text may be encrypted to a plurality of cipher texts. Therefore, encryptions of the plain text may be untraceable because the plain text may not be guessed by encrypting test texts and compare encryption results with the cipher text of the plain text. This may provide a high level of security. Furthermore, a semantically secure homomorphic encryption E may be re-randomized to provide further security. A person skilled in the art will appreciate that a string encrypted with E may be manipulated without being able to gain knowledge about the string. An example for a semantically secure homomorphic encryption scheme may be the Goldwasser-Micali encryption.

The system B 200 may send the data item 342 to the system A 100 and accordingly system A 100 receives the encrypted representation E_B(y'_B) of the second share of the second string. System A 100 processes E_B(y'_B) to compute data item 344.

Data item 344 represents the representation g of the encrypted representation of the second share of the second string. The representation g of the encrypted representation may be computed by encrypting the string of random elements with the homomorphic public key encryption scheme to give E_B (r_A). For this, system A 100 may use the public key provided by system B 200 for encrypting a string with encryption scheme E_B. The sequence of the encrypted representation E_B(y'_B) of the second share of the second string may then be multiplied with the sequence of the encrypted string E_B (r_A) of random elements to give g. In a further example, the encrypted representation of the second share of the second string may be identical to the representation of the second share of the second string. In the further example, g may be computed by combining the representation of the second share of the second string with the string of random elements.

Data item 346 represents the rearranged representation g' of the encrypted representation g. In an example, g' is computed by transforming g into a bit sequence and rotating to the right each of the bit sequence by a number of positions equal to 8 1_A. The number of positions 8 1_A is identical to a number of bits of a bit sequence into which the first share of the first string is transformed having the length 1_A. In an example, an element of a sequence of a string is transformed into a sequence of eight bits therefore resulting in the number of 8 1_A. In a further example, using a further representation of an element of a sequence of a string the factor eight may be different. It follows that the system A 100 sends the data item 346 to the system B 200 that receives the rearranged representation g' of the encrypted representation of the second share of the second string.

The system B 200 computes data item 348 representing the decrypted string f by decrypting g' with a decryption scheme D_B of the encryption scheme E_B. The decryption scheme D_B is configured to decrypt a cipher text using a private key that is related to the public key of the encryption scheme E_B with which the cipher text has been computed. As a person skilled in the art will appreciate it may be due to the homomorphic feature of the encryption scheme that the rearranged representation g' of the encrypted representation may be decrypted. In other words, the encrypted representation may be transformed into the representation of the encrypted representation and may still be decrypted and relatable to the representation y'_B 340. In a further example, the encrypted representation of the second share of the second string may be identical to the representation of the second share of the second string. In the further example, the decrypted string f may be identical to g'.

Data item 350 represents the rearranged decrypted string f' that is computed by transforming f into a bit sequence and rotating to the right each bit of the bit sequence by a number of positions equal to 8 1_B. The number of positions is identical to a number of bits of a bit sequence into which the second share of the first string is transformed. In an example, the number of positions is identical to 8 1_B.

In a further example, bit sequences may generally be shifted to the right by the number of positions instead of rotated to the right by the number of positions. In the further example, this may result in a more complicated situation in the event of that 1_max is reached by shifted bits.

Data item 352 includes the second share of the concatenated string represented by Z_B. Z_B may be computed adding length values 1_B and m_B and by combining the rearranged decrypted string f' with the sequence x_B of the second share of the first string.

Computing the first share of the concatenated string represented by Z_A 372 may start with data item 360 being processed by system A 100. Processing operations of system A 100 for computing the first share of the concatenated string may be related to processing operations of system B 200 for computing the second share of the concatenated string. Furthermore, processing operations of system B 200 for computing the first share of the concatenated string may be related to processing operations of system A 100 for computing the second share of the concatenated string.

The data item 360 includes a sequence y'_A of a representation of the first share of the second string. The sequence y'_A of the representation of the second share is computed by combining the sequence of the first share y_A of the second string with a sequence of a string of random elements r_A. The random elements may be determined using a standard random number generator to determine random, pseudo-random or substantially random values. In a further example, the representation of the second share may be identical to the second share of the second string because no string with random elements is combined with the second share of the second string. The data item 360 may be used to compute data item 362.

Data item 362 represents a sequence of the encrypted representation E_A (y'_A) of the first share. The representation of the first share of the second string is encrypted with the public key encryption scheme E_A that is homomorphic with respect to the combining operation. In an example of the figure, the public key encryption scheme may use a pair of keys one of which is a public key for encrypting a value and one of which is a private key for decrypting a value. Encryption scheme E_A may use an encryption function that is identical to the encryption function of E_B. However, E_A may use a set of public key and private key that is different from the set that E_B uses. System A 100 may provide the public key used for encryption scheme E_A to system B 200 so that system B 200 may encrypt strings with E_A. E_A is an example of a homomorphic encryption scheme E that may be semantically secure.

The system A 100 may send the data item 362 to the system B 200 and accordingly system B 200 receives the encrypted representation E_B(y'_A) of the first share of the second string. System B 200 processes E_B(y'_A) to compute data item 364.

Data item 364 represents the representation e of the encrypted representation of the first share of the second string. The representation e of the encrypted representation may be computed by encrypting the string of random elements with the homomorphic public key encryption scheme to give E_A (r_B). For this, system B 200 may use the public key provided by system A 100 for encrypting a string with encryption scheme E_A. The sequence of the encrypted representation E_B(y'_A) of the first share of the second string may then be multiplied with the sequence of the encrypted string E_B (r_B) of random elements to give e. In a further example, the encrypted representation of the first share of the second string may be identical to the representation of the first share of the second string. In the further example, e may be computed by combining the representation of the first share of the second string with the string of random elements.

Data item 366 represents the rearranged representation e' of the encrypted representation e. In an example, e' is computed by transforming e into a bit sequence and rotating to the right each bit of the bit sequence by a number of positions equal to 8 1_B. The number of positions 8 1_B is identical to a number of bits of a bit sequence into which the second share of the first string is transformed having the length 1_B. In an example, an element of a sequence of a string is transformed into a sequence of eight bits therefore resulting in the number of 8 1_B. In a further example, using a further representation of an element of a sequence of a string the factor eight may be different. It follows that the system B 200 sends the data item 366 to the system A 100 that receives the rearranged representation e' of the encrypted representation of the first share of the second string.

The system A 100 computes data item 368 representing the decrypted string d by decrypting e' with a decryption scheme D_A of the encryption scheme E_A. The decryption scheme D_A is configured to decrypt a cipher text using a private key that is related to the public key of the encryption scheme E_A with which the cipher text has been computed. In a further example, the encrypted representation of the first share of the second string may be identical to the representation of the first share of the second string. In the further example, the decrypted string d may be identical to e'.

Data item 370 represents the rearranged decrypted string d' that is computed by transforming d into a bit sequence and rotating to the right each bit of the bit sequence by a number of positions equal to 8 1_A. The number of positions is identical to a number of bits of a bit sequence into which the first share of the first string is transformed. In an example, the number of positions is identical to 8 1_A. In a further example, bit sequences may generally be shifted to the right by the number of positions instead of rotated to the right by the number of positions.

Data item 372 includes the first share of the concatenated string represented by Z_A. Z_A may be computed adding length values 1_A and m_A and by combining the rearranged decrypted string d' with the sequence x_A of the first share of the first string.

Final results Z_A and Z_B may than be combined to give the string that includes the concatenation of the first string and the second string. In a further example, final results Z_A and Z_B may be processed further individually in following string manipulations.

Figure 4A:
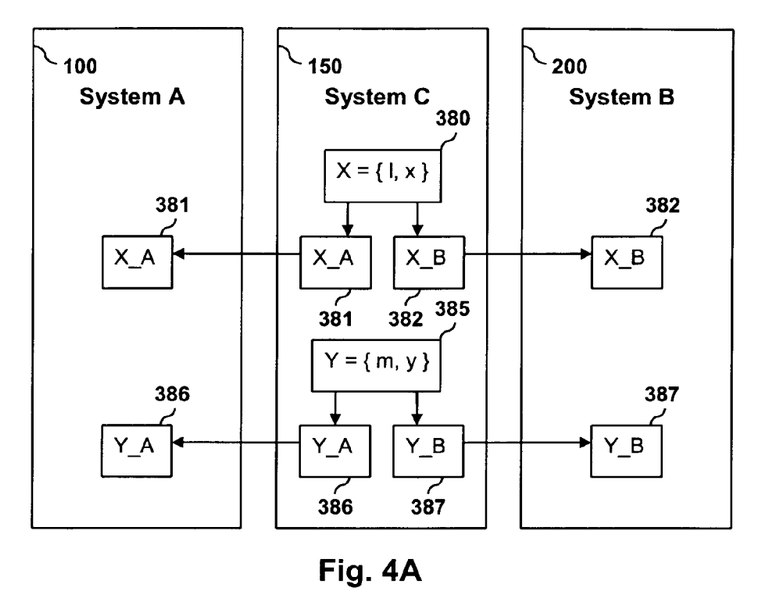
FIG. 4A is a block diagram of two example systems participating in a protocol and a third example system providing input data items.

FIG. 4A is a block diagram of two example systems participating in a protocol and a third example system providing input data items. The two example systems participating in the protocol for concatenating the first string and the second string are the system A 100 and the system B 200. The third system C 150 provides the input data items for the protocol.

In an example, system C 150 may have a representation X 380 of the first string and a representation Y 385 of the second string. The system C 150 may split the representation X 380 into the first share of the first string represented by X_A 381 and into the second share of the first string represented by X_B 382. The splitting may be done in such a way that combining the first share of the first string represented by X_A 381 and the second share of the first string represented by X_B 382 gives the first string. The splitting may be done using a standard random number generator to determine how a bit of the sequence of the first string is split into two split bits. Furthermore, a standard random number generator may be used to determine which one of the split bits is distributed to the first share of the first string and which one of the split bits is distributed to the second share of the first string.

Accordingly, system C 150 may split the representation Y 385 into the first share of the second string represented by Y_A 386 and into the second share of the second string represented by Y_B 387. The splitting may be done in such a way that combining the first share of the second string and the second share of the first string gives the first string. The splitting may be done using a standard random number generator.

Following computing the splits, system C 150 may send the first share of the first string represented by X_A 381 and the first share of the second string represented by Y_A 386 to the system A 100. Furthermore, system C 150 may send the second share of the first string represented by X_B 382 and the second share of the second string represented by Y_B 387 to the system B 200. Following receiving the shares of the first string and the second string the system A 100 and the system B 200 may participate in the protocol to concatenate the first string and the second string without gaining knowledge about the first string or the second string.

Figure 4B:
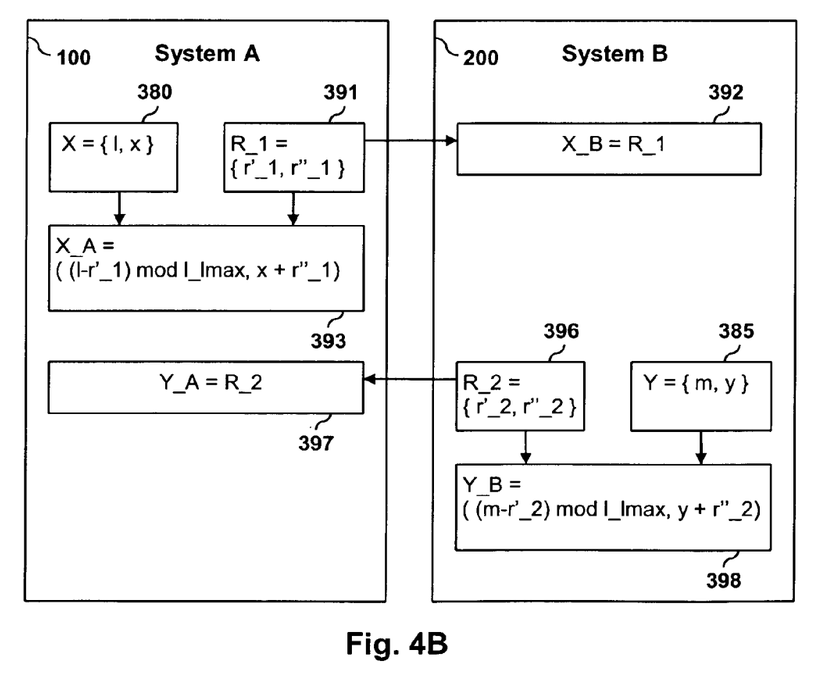
FIG. 4B is a block diagram of two example systems participating in a protocol and providing input data items.

FIG. 4B is a block diagram of two example systems participating in a protocol and providing input data items. The two example systems participating in the protocol are the system A 100 and the system B 200.

In an example, system A 100 has the first string represented by X 380 and system B 200 has the second string represented by Y 385. System A 100 and system B 200 may for example desire to concatenate the first string and the second string in such a way that the concatenated string is not revealed to the system A 100 or the system B 200. In a further example, system A 100 may have the second string and system B 200 may have the first string. In such a case, system A 100 may execute operations identical to an example of the figure but for the second string and system B 200 may execute operations identical to an example of the figure for the first string.

In an example, system A 100 may create a string with random elements represented by R_1 391. R_1 391 has a length value of r'_1 and sequence of elements identical to r"_1. R_1 391 may have been created using a standard random number generator. System A 100 may send R_1 391 to system B 200 that may set the second share of the first string represented by X_B 392 equal to R_1.

System A 100 may compute the first share of the first string represented by X_A 393 from the first string represented by X 380 and the string of random elements represented by R_1 391 to be X_A=((1−r'_1) mod 1_lmax, x+r"_1).

System B 200 may create a further string with random elements represented by R_2 396. R_2 396 has a length value of r'_2 and sequence of elements identical to r"_2. R_2 396 may have been created using a standard random number generator. System B 200 may send R_2 396 to system A 100 that may set the first share of the second string represented by Y_A 397 equal to R_2.

System B 200 may compute the second share of the second string represented by Y_B 398 from the first string represented by Y 385 and the further string of random elements represented by R_2 396 to be Y_B=((m−r'_2) mod 1_lmax, y+r"_2).

Figure 5:
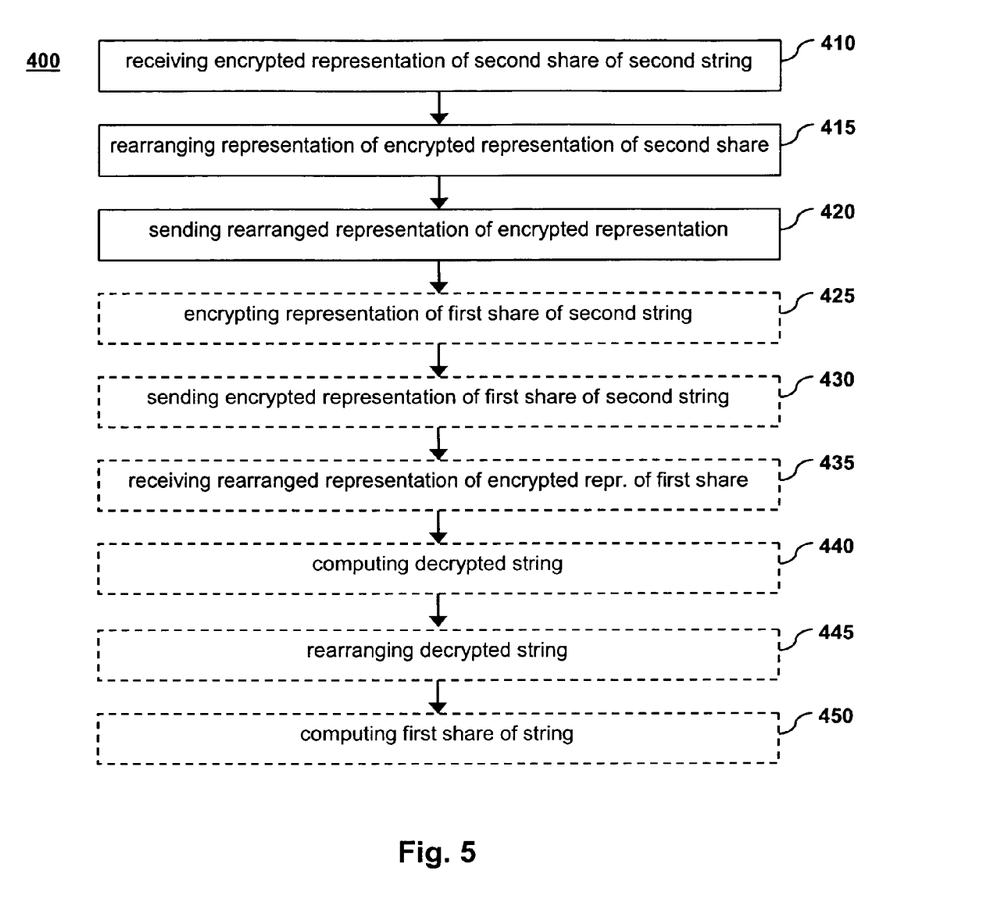
FIG. 5 is a flow diagram of an embodiment participating in an example protocol.

FIG. 5 is a flow diagram of an embodiment 400 participating in an example protocol. The example embodiment 400 is a method for contributing to a concatenation of a first string and a second string. The method may be executed by a first party that uses for example a computer system and that may communicate with a second party. The method includes optional operations that are represented by broken lines. Operations of the method may be executed in an order differing from the order given in an example. In a further example, optional method operations may be executed prior to further operations of the method.

Optional operations of example methods are designated as optional herein because the optional operations may be executed by a further party participating in a protocol. Therefore, operations of example methods that are not designated as optional may be or may not be required for executing the example methods. Furthermore, example methods may have features with example implementations that are identical or similar to example implementations of features of example systems described herein. Furthermore, an example implementation of a feature of an embodiment may be independent from a further example implementation of a further feature of the embodiment. Independent example implementations may be combined in an example embodiment and may not be combined in a further example embodiment.

The method includes receiving 410 the encrypted representation of the second share of the second string. From this, the representation of the encrypted representation may be computed by multiplying the encrypted representation with the encrypted string of random elements. The string or random elements may be encrypted using a homomorphic encryption scheme that may be semantically secure with a public key that may be provided from the second party.

Following operations may include rearranging 415 the representation of the encrypted representation of the second share of the second string using the length value of the first share of the first string. Rearranging 415 the representation may include transforming the representation into bit sequences. Rearranging 415 may further include rotating to the right each of the bit sequences by a number of positions that is related to the length value of the first share of the first string. The number of positions may be identical to the number of bits of the bit sequence into which the sequence of the first share of the first string is transformed.

The method 400 may include sending 420 the rearranged representation of the encrypted representation of the second share of the second string to the second system of the second party.

A following optional operation may include encrypting 425 the representation of the first share of the second string using a homomorphic encryption scheme that may be semantically secure with a public key that may be provided to the second party.

Optional operations of the method 400 may include sending 430 the encrypted representation of the first share of the second string to the second party.

A following optional operation may include receiving 435 the rearranged representation of the encrypted representation of the first share of the second string.

In an example it follows optional operation computing 440 the decrypted string by decrypting the encrypted representation of the rearranged first share of the second string. For this the private key may be used that is related to the public key of the homomorphic encryption scheme with which the representation of the first share of the second string has been encrypted.

It may further follow optional operation rearranging 445 the decrypted string using the length value of the first share of the first string. Rearranging 445 may include transforming the sequence of the decrypted string and rotating to the right by the same number of bits as in previous rearranging operation 415.

It may follow optional operation computing 450 the first share of a string. The string may include the first share of the concatenation string, that is, the first string concatenated with the second string.

Figure 6:
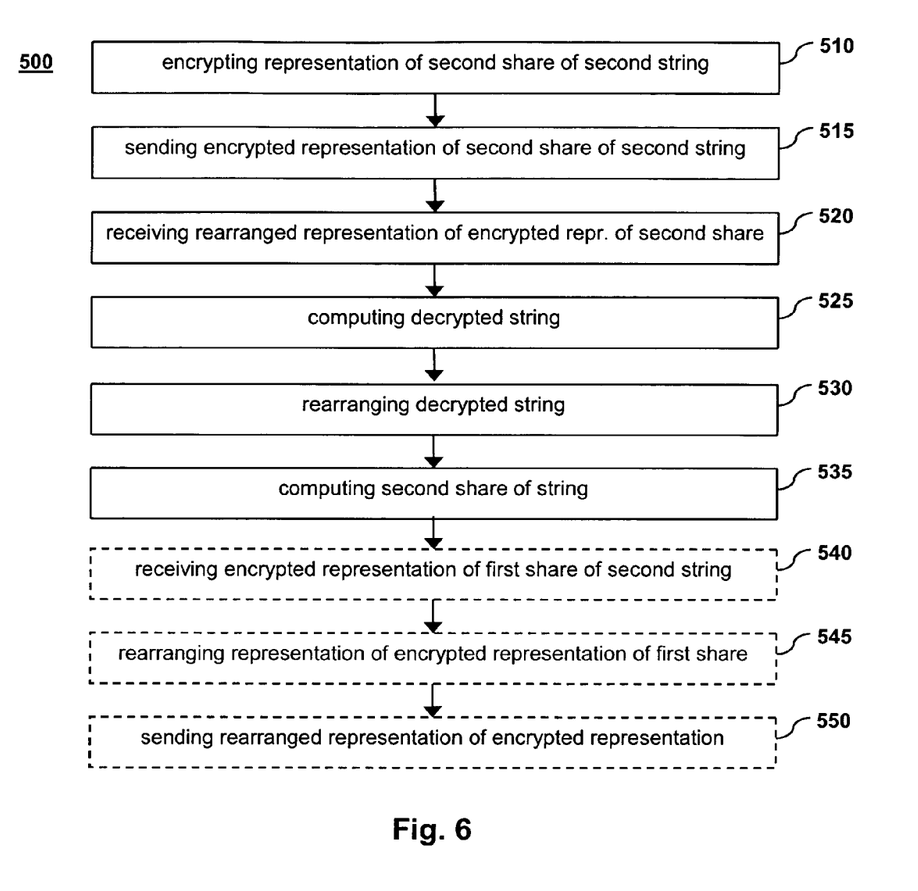
FIG. 6 is a flow diagram of a further embodiment participating in the example protocol.

FIG. 6 is a flow diagram of a further embodiment 500 participating in the example protocol. The example embodiment 500 is a method for contributing to the concatenation of the first string and the second string. The method may be executed by the second party that uses for example a computer system and that may communicate with the first party. The method includes optional operations that are represented by broken lines. Operations of the method may be executed in an order differing from the order given in an example.

The method 500 includes encrypting 510 the representation of the second share of the second string using a homomorphic encryption scheme that may be semantically secure with a public key that may be provided to the first party.

Operations of the method 500 may include sending 515 the encrypted representation of the second share of the second string to the first party.

Following operations may include receiving 520 the rearranged representation of the encrypted representation of the second share of the second string.

The example method 500 includes computing 525 the decrypted string by decrypting the rearranged representation of the encrypted representation of the first share of the second string. For this the private key may be used that is related to the public key of the homomorphic encryption scheme with which the representation of the second share of the second string has been encrypted.

A rearranging 530 of the decrypted string using the length value of the first share of the first string may follow. Rearranging 530 the representation may include transforming the representation into bit sequences. Rearranging 530 may further include rotating to the right each of the bit sequences by a number of positions that is related to the length value of the second share of the first string. The number of positions may be identical to the number of bits of the bit sequence into which the sequence of the second share of the first string is transformed.

The example method 500 includes computing 435 the second share of the string that includes the first share of the concatenation string.

Optional operation may include receiving 540 the encrypted representation of the first share of the second string. From this, the representation of the encrypted representation may be computed by multiplying the encrypted representation with the encrypted string of random elements. The string or random elements may be encrypted using a homomorphic encryption scheme that may be semantically secure with a public key that may be provided from the second party.

Following optional operation may include rearranging 545 the representation of the encrypted representation of the first share of the second string using the length value of the first share of the first string. Rearranging 545 may include transforming the sequence of the decrypted string and rotating to the right by the same number of bits as in previous rearranging operation 530.

The method 500 may include sending 550 the rearranged representation of the encrypted representation of the second share of the second string to the second system of the second party.

Figure 7:
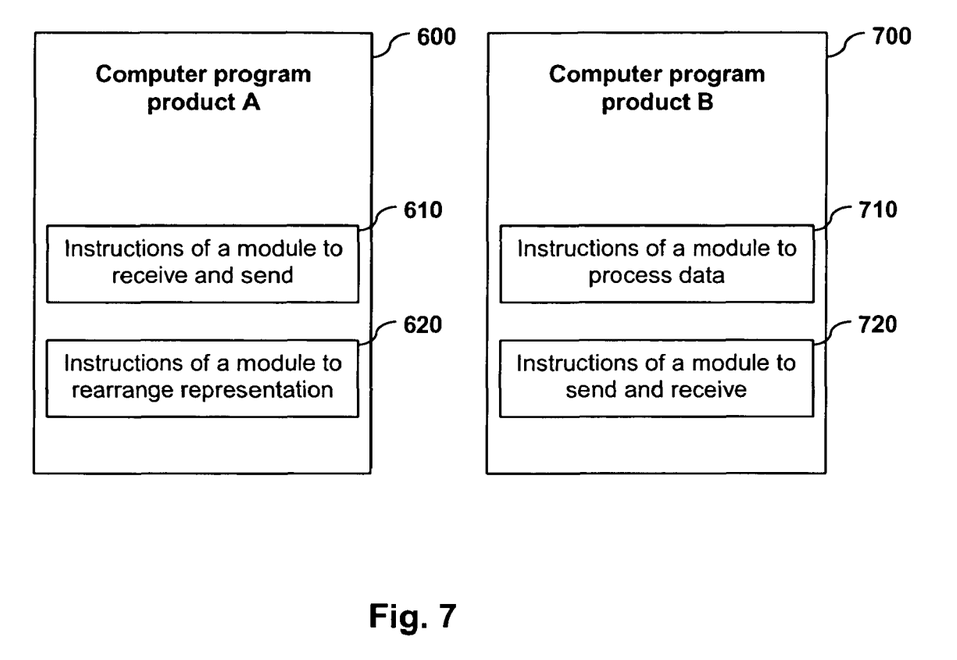
FIG. 7 is a block diagram of two example computer program products.

FIG. 7 is a block diagram of two example computer program products. The two computer program products include computer program product A 600 and computer program product B 700.

The computer program product A 600 for contributing to concatenating the first string and the second string may include instructions of a module 610 to receive the encrypted representation of the second share of the second string and to send the rearranged representation of the encrypted representation of the second share of the second string to a further party.

The computer program product A 600 may further include instructions of a module 620 to rearrange the representation of the encrypted representation of the second share of the second string.

The computer program product B 700 for contributing to concatenating the first string and the second string may include instructions of a module 710 to process data. Processing data may include: encrypting the representation of a second share of the second string, computing the decrypted string by decrypting the rearranged representation of the encrypted representation of the second share of the second string, rearranging the decrypted string using the length value of the second share of the first string, and computing the second share of the string including the first string concatenated with the second string by combining the second share of the first string with the rearranged decrypted string.

The computer program product B 700 may include instructions of a module 720 to send the encrypted representation of the second share of the second string to the further party and to receive the rearranged representation of the encrypted representation of the second share of the second string.

As noted above, example embodiments within the scope of the present invention include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer. Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

What is claimed is:

1. A system to contribute to a concatenation of a first string and a second string, the system comprising:
  a communication unit to receive from a first additional system an encrypted representation of a second share of the second string, the second share of the second string being combinable with a first share of the second string via a combining operation to generate the second string or a third string that contains the second string, the second string not being revealed to the system; and
  a processing unit to, using one or more processors, rearrange a representation of the encrypted representation of the second share of the second string using a length value of a first share of the first string to generate a rearranged representation of the encrypted representation of the second share of the second string, the first share of the first string being combinable with a second share of the first string via a combining operation to generate the first string or a fourth string that contains the first string, the first string not being revealed to the system, the processing unit further to compute a decrypted string by decrypting a rearranged representation of an encrypted representation of the first share of the second string, rearrange the decrypted string using the length value of the first share of the first string, and compute a first share of a fifth string comprising the first string concatenated with the second string by combining the first share of the first string with the rearranged decrypted string, the first share of the fifth string being combinable with a second share of the fifth string via a combining operation to generate the fifth string or a sixth string that contains the fifth string;

the communication unit further to send the rearranged representation of the encrypted representation of the second share of the second string to the first additional system or a second additional system.

2. The system of claim 1 wherein the communication unit is to:
send the encrypted representation of the first share of the second string to the first additional system or the second additional system; and
receive the rearranged representation of the encrypted representation of the first share of the second string from the first additional system or the second additional system, wherein the processing unit is to encrypt the representation of the first share of the second string.

3. The system of claim 1, wherein the encrypted representation of the second share of the second string is encrypted with a public key encryption scheme that is homomorphic with respect to a combining operation.

4. The system of claim 3, wherein the homomorphic public key encryption scheme is semantically secure.

5. The system of claim 2, wherein the processing unit is to encrypt the representation of the first share of the second string with a public key encryption scheme that is homomorphic with respect to a combining operation and wherein the decrypted string is computed with a decryption scheme of the public key encryption scheme.

6. The system of claim 2, wherein the processing unit is to compute the representation of the first share of the second string by combining the first share of the second string with a string of random elements and the representation of the encrypted representation of the second share of the second string by encrypting the string of random elements with the homomorphic public key encryption scheme and multiplying the encrypted representation of the second share of the second string with the encrypted string of random elements.

7. The system of claim 1, wherein the processing unit is to combine a first string with a second string by transforming the first string into a first bit sequence and the second string into a second bit sequence and using an exclusive OR operation to combine a bit of the first bit sequence with a corresponding bit of the second bit sequence to a corresponding bit of a bit sequence representing a combined string.

8. The system of claim 2, wherein the processing unit is to rearrange the representation of the encrypted representation of the second share of the second string and the decrypted string by transforming the representation of the encrypted representation of the second share of the second string and the decrypted string into bit sequences and rotating to the right each of the bit sequences by a number of positions that is identical to a number of bits of a bit sequence into which the first share of the first string is transformed.

9. A system to contribute to a concatenation of a first string and a second string, the system comprising:
a processing unit to, using one or more processors, encrypt a representation of a second share of the second string to generate an encrypted representation of the second share of the second string, the second share of the second string being combinable with a first share of the second string via a combining operation to generate the second string or a third string that contains the second string, the second share of the second string being received from a first additional system, the second string not being revealed to the system; and
a communication unit to send the encrypted representation of the second share of the second string to the first additional system or a second additional system and receive a rearranged representation of the encrypted representation of the second share of the second string from the first additional system or the second additional system;

the processing unit further to:
compute a decrypted representation of the second share of the string by decrypting the rearranged representation of the encrypted representation of the second share of the second string;
rearrange the decrypted representation of the second share of the second string using the length value of the second share of the first string to generate a rearranged decrypted string, the first share of the first string being combinable with a second share of the first string via a combining operation to generate the first string or a fourth string that contains the first string, the first string not being revealed to the system; and
compute a second share of a fifth string comprising the first string concatenated with the second string by combining the second share of the first string with the rearranged decrypted string, the second share of the fifth string being combinable with the second share of the fifth string via a combining operation to generate the fifth string or a sixth string that contains the fifth string.

10. The system of claim 9 wherein
the communication unit is to receive from the first additional system or the second additional system an encrypted representation of the first share of the second string;
the processing unit is to rearrange a representation of the encrypted representation of the first share of the second string using a length value of the second share of the first string to generate a rearranged representation of the encrypted representation of the first share of the second string; and
the communication unit further is to send the rearranged representation of the encrypted representation of the first share of the second string to the first additional system or the second additional system.

11. The system of claim 9, wherein the processing unit is to encrypt the representation of the second share of the second string with a public key encryption scheme that is homomorphic with respect to a combining operation and wherein the processing unit is to compute the decrypted string with a decryption scheme of the public key encryption scheme.

12. The system of claim 11, wherein the homomorphic public key encryption scheme is semantically secure.

13. The system of claim 10, wherein the encrypted representation of the first share of the second string is encrypted with a public key encryption scheme that is homomorphic with respect to a combining operation.

14. The system of claim 9, wherein the processing unit is to compute the representation of the second share of the second string by combining the second share of the second string with a string of random elements and the representation of the encrypted representation of the second share of the second string by encrypting the string of random elements with the homomorphic public key encryption scheme and multiplying the encrypted representation of the second share of the second string with the encrypted string of random elements.

15. The system of claim 9, wherein the processing unit is to combine a first string with a second string by transforming the first string into a first bit sequence and the second string into a second bit sequence and using an exclusive OR operation to combine a bit of the first bit sequence with a corresponding bit of the second bit sequence to a corresponding bit of a bit sequence representing a combined string.

16. The system of claim 10, wherein the processing unit is to rearrange the representation of the encrypted representation of the first share of the second string and the decrypted string by transforming the representation of the encrypted representation of the first share of the second string and the decrypted string into bit sequences and rotating to the right each of the bit sequences by a number of positions that is identical to a number of bits of a bit sequence into which the second share of the first string is transformed.

17. A method to contribute to concatenating a first string and a second string, the method comprising:
receiving from a first additional system an encrypted representation of a second share of the second string, the second share of the second string being combinable with a first share of the second string via a combining operation to generate the second string or a third string that contains the second string, the second string not being revealed to the system;
rearranging, using one or more processors, a representation of the encrypted representation of the second share of the second string using a length value of a first share of the first string to generate a rearranged representation of the encrypted representation of the second share of the second string, the first the first share of the first string being combinable with a second share of the first string via a combining operation to generate the first string or a fourth string that contains the first string, the first string not being revealed to the system;
sending the rearranged representation of the encrypted representation of the second share of the second string to the first additional system or a second additional system;
computing a decrypted string by decrypting a rearranged representation of an encrypted representation of the first share of the second string;
rearranging the decrypted string using the length value of the first share of the first string to generate a rearranged decrypted string; and
computing a first share of a fifth string comprising the first string concatenated with the second string by combining the first share of the first string with the rearranged decrypted string, the first share of the fifth string being combinable with a second share of the fifth string via a combining operation to generate the fifth string or a sixth string that contains the fifth string.

18. The method of claim 17 further comprising:
encrypting the representation of the first share of the second string to generate the encrypted representation of the first share of the second string;
sending the encrypted representation of the first share of the second string to the first additional system or the second additional system; and
receiving the rearranged representation of the encrypted representation of the first share of the second string from the first additional system or the second additional system.

19. The method of claim 18, wherein encrypting the representation of the first share of the second string comprises using a public key encryption scheme that is homomorphic with respect to a combining operation and wherein computing the decrypted string comprises using a decryption scheme of the public key encryption scheme.

20. The method of claim 19, wherein the homomorphic public key encryption scheme is semantically secure.

21. The method of claim 19, further computing the representation of the first share of the second string by combining the first share of the second string with a string of random elements and computing the representation of the encrypted representation of the second share of the second string by encrypting the string of random elements using the homomorphic public key encryption scheme and multiplying the encrypted representation of the second share of the second string with the encrypted string of random elements.

22. The method of claim 17, wherein combining a first string with a second string comprises transforming the first string into a first bit sequence and the second string into a second bit sequence and using an exclusive OR operation to combine a bit of the first bit sequence with a corresponding bit of the second bit sequence to a corresponding bit of a bit sequence representing a combined string.

23. The method of claim 18, wherein rearranging the representation of the encrypted representation of the second share of the second string and the decrypted string comprises transforming the representation of the encrypted representation of the second share of the second string and the decrypted string into bit sequences and rotating to the right each of the bit sequences by a number of positions that is identical to a number of bits of a bit sequence into which the first share of the first string is transformed.

24. A method to contribute to concatenating a first string and a second string, the method comprising:
encrypting, using one or more processors, a representation of a second share of the second string to generate an encrypted representation of the second share of the second string, the second share of the second string being combinable with a first share of the second string via a combining operation to generate the second string or a third string containing the second string, the second share of the second string being received from a first additional system, the second string not being revealed to the system;
sending the encrypted representation of the second share of the second string to a first additional system or a second additional system;
receiving a rearranged representation of the encrypted representation of the second share of the second string;
computing a decrypted representation of the second share of the string by decrypting the rearranged representation of the encrypted representation of the second share of the second string;
rearranging the decrypted representation of the second share of the string using the length value of the second share of the first string to generate a rearranged decrypted string, the first share of the first string being combinable with a second share of the first string via a combining operation to generate the first string or a fourth string containing the first string, the first string not being revealed to the second system; and
computing a second share of a fifth string comprising the first string concatenated with the second string by combining the second share of the first string with the rearranged decrypted string, the first share of the fifth string being combinable with the second share of the fifth string via a combining operation to generate the fifth string or a sixth string containing the fifth string.

25. The method of claim 24 further comprising:
receiving from the first additional system or the second additional system an encrypted representation of the first share of the second string;
rearranging a representation of the encrypted representation of the first share of the second string using a length value of the second share of the first string to generate a rearranged representation of the encrypted representation of the first share of the second string; and
sending the rearranged representation of the encrypted representation of the first share of the second string to the first additional system or the second additional system.

26. The method of claim 24, wherein encrypting the representation of the second share of the second string comprises using a public key encryption scheme that is homomorphic with respect to a combining operation and wherein computing the decrypted string comprises using a decryption scheme of the public key encryption scheme.

27. The method of claim 26, wherein the homomorphic public key encryption scheme is semantically secure.

28. The method of claim 26, further comprising computing the representation of the second share of the second string by combining the second share of the second string with a string of random elements and computing the representation of the encrypted representation of the second share of the second string by encrypting the string of random elements using the homomorphic public key encryption scheme and multiplying the encrypted representation of the second share of the second string with the encrypted string of random elements.

29. The method of claim 24, wherein combining a first string with a second string comprises transforming the first string into a first bit sequence and the second string into a second bit sequence and using an exclusive OR operation to combine a bit of the first bit sequence with a corresponding bit of the second bit sequence to a corresponding bit of a bit sequence representing a combined string.

30. The method of claim 25, wherein rearranging the representation of the encrypted representation of the first share of the second string and the decrypted string comprises transforming the representation of the encrypted representation of the first share of the second string and the decrypted string into bit sequences and rotating to the right each of the bit sequences by a number of positions that is identical to a number of bits of a bit sequence into which the second share of the first string is transformed.

31. A computer program product executable by a computer, the computer program product embodied in a non-transitory computer-readable medium and comprising instructions to execute:
a first module of a system, the first module to receive from a first additional system an encrypted representation of the second share of the second string, the second share of the second string being combinable with a first share of the second string via a combining operation to generate the second string or a third string that contains the second string, the second string not being revealed to the system, the first module to send a rearranged representation of the encrypted representation of the second share of the second string to the first additional system or a second additional system; and a second module of the system, the second module to rearrange a representation of the encrypted representation of the second share of the second string using a length value of a first share of the first string, the first share of the first string being combinable with a second share of the first string via a combining operation to generate the first string or a fourth string that contains the first string, the first string not being revealed to the system, compute a decrypted string by decrypting a rearranged representation of an encrypted representation of the first share of the second string, rearrange the decrypted string using the length value of the first share of the first string to generate a rearranged decrypted string, and compute a first share of a fifth string comprising the first string concatenated with the second string by combining the first share of the first string with the rearranged decrypted string, the first share of the fifth string being combinable with a second share of the fifth string via a combining operation to generate the fifth string or a sixth string that contains the fifth string.

32. A computer program product executable by a computer, the computer program product embodied in a non-transitory computer-readable medium and comprising instructions to execute:
a first module of a system, the first module to:
encrypt a representation of a second share of the second string to generate an encrypted representation of a second share of the second string, the second share of the second string being combinable with a first share of the second string via a combining operation to generate the second string or a third string that contains the second string, the second share of the second string being received from a first additional system, the second string not being revealed to the system;
compute a decrypted representation of the second share of the string by decrypting a rearranged representation of the encrypted representation of the second share of the second string;
rearrange the decrypted representation of the second share of the string using the length value of the second share of the first string to generate a rearranged decrypted string, a first share of the first string being combinable with the second share of the first string via a combining operation to generate the first string or a fourth string that contains the first string, the first string not being revealed to the first system; and
compute a second share of a fifth string comprising the first string concatenated with the second string by combining the second share of the first string with the rearranged decrypted string, the first share of the fifth string being combinable with a second share of the fifth string via a combining operation to generate the fifth string or a sixth string that contains the fifth string; and
a second module of the system, the second module to:
send the encrypted representation of the second share of the second string to the first additional system or a second additional system; and
receive the rearranged representation of the encrypted representation of the second share of the second string from the first additional system or the second additional system.

* * * * *